United States Patent
Chan et al.

(10) Patent No.: US 6,680,881 B2
(45) Date of Patent: Jan. 20, 2004

(54) METHOD FOR DECIDING THE DIRECTION OF PICK-UP HEAD OF DISK DRIVER WHILE CROSSING TRACKS

(75) Inventors: Yi-Chung Chan, Taipei (TW); Chih-Yang Liaw, Tao-Yuan Hsien (TW)

(73) Assignee: Via Technologies Inc., Hsin-Tien (TW)

( * ) Notice: Subject to any disclaimer, the term of this patent is extended or adjusted under 35 U.S.C. 154(b) by 0 days.

(21) Appl. No.: 10/063,943

(22) Filed: May 28, 2002

(65) Prior Publication Data

US 2003/0043700 A1 Mar. 6, 2003

(30) Foreign Application Priority Data

Aug. 30, 2001 (TW) ........................................ 90121530 A

(51) Int. Cl.⁷ ............................ G11B 21/08; G11B 7/00
(52) U.S. Cl. ................... 369/30.17; 369/44.28
(58) Field of Search .......................... 369/30.17, 44.28, 369/30.15, 30.16, 30.1, 43, 44.11, 44.32, 44.35, 44.37, 30.13, 47.11, 44.29, 53.14, 44.34; 360/77.04, 78.05, 78.14

(56) References Cited

U.S. PATENT DOCUMENTS

| | | | | |
|---|---|---|---|---|
| 4,855,977 A | * | 8/1989 | Getreuer et al. | 369/30.17 |
| 4,985,882 A | * | 1/1991 | Tanaka et al. | 369/44.32 |
| 5,497,360 A | * | 3/1996 | Takahara et al. | 369/44.28 |
| 5,742,568 A | * | 4/1998 | Nakano et al. | 369/44.35 |

* cited by examiner

*Primary Examiner*—Ali Neyzari
(74) *Attorney, Agent, or Firm*—Winston Hsu

(57) ABSTRACT

A method for determining a track-cross direction of a pick-up head of an optical disk drive includes the following steps. (1) When a track-cross velocity of the pick-up head was determined to be greater than a predetermined velocity, it is determined whether the track-cross velocity of the pick-up head is changed to be less than the predetermined velocity. If not, the track-cross direction remains unchanged. (2) When the track-cross velocity of the pick-up head was determined to be less than the predetermined velocity, it is determined whether the track-cross velocity of the pick-up head is changed to be greater than the predetermined velocity. If not, the track-cross direction is determined according to a phase difference between a first track-cross signal and a second track-cross signal.

8 Claims, 3 Drawing Sheets

METHOD FOR DECIDING THE DIRECTION OF PICK-UP HEAD OF DISK DRIVER WHILE CROSSING TRACKS

BACKGROUND OF INVENTION

1. Field of the Invention

The present invention relates to a method for determining a track-cross direction of a pick-up head of an optical disk drive, and more particularly, to a method that uses two different deciding methods to determine the track-cross direction of the pick-up head.

2. Description of the Prior Art

Each CD (Compact Disc) drive or DVD (Digital Versatile Disc) drive has a pick-up head for reading data from an optical disc or writing data onto the optical disc. Every time when the pick-up head executes the reading operation or the writing operation, the pick-up head must first move to a target track on the optical disc so that the up heads can start to read data or write data. The search operations can be classified into the short distance cross-track operation and the long distance cross-track operation according to a distance between the present position of the pick-up head and the target track position. The pick-up head is installed on a movable sled. The sled is driven by a sled motor. A velocity of the sled (identical to a track-cross velocity of the pick-up head) is decided according to which kind of track-cross operation (the short distance cross-track operation or the long distance cross-track operation). When the pick-up head executes a short distance track-cross operation, the sled and the pick-up head move with a low velocity. This is because if the pick-up head moves too fast, the pick-up head maybe easily overshoot the target track. When the pick-up head executes a long distance cross-track operation, the velocity of the sled and the pick-up head must be accelerated to a certain velocity and then decelerated to a low velocity so that the pick-up head can arrive the target track within a certain time.

No matter if the pick-up head executes the short distance track-cross operation or the long distance track-cross operation, the pick-up head must arrive at the target track correctly and quickly (or arrive at the target track with a predetermined time). The distance between two neighboring tracks becomes shorter as data density on optical discs increases. The access rate of the optical disc drive also gets faster and faster. So, how to decrease time taken on track crossing is still a major topic.

No matter if the pick-up head executes the short distance track-cross operation or the long distance track-cross operation, the velocity and the direction of the pick-up head relative to the optical disc are important parameters of track-cross control. After determining the track-cross direction of the pick-up head, the optical disc drive is able to control the sled motor to move the pick-up head to the target track.

For example, when the optical disc drive executes the track-cross operation, the optical disc drive constantly determines the track-cross direction of the pick-up head. The prior optical disc drive uses different methods to determine the cross-track direction according to the track-cross velocity of the pick-up head. When the pick-up head moves in low speed, the optical disc drive determines the track-cross direction of the pick-up head according to a phase difference between a RFRP (radio frequency ripple) signal and a tracking error (TE) signal. The RFRP signal is defined as the difference between the peak envelope and the bottom envelope of the RF signal when the pick-up head emits a laser beam to the pit portion or the land portion of the track on the optical disc. The tracking error signal represents whether the pick-up head is located at the center of the target track. Frequencies of the RFRP signal and the tracking error signal are related to the track-cross velocity of the pick-up head. If the track-cross velocity of the pick-up head is fast, the frequencies of the RFRP signal and the tracking error signal is high. When the track-cross velocity of the pick-up head becomes faster, an error will be generated if the phase difference between the two signals is used to determine the cross-track direction of the pick-up head. Therefore, when the cross-track velocity of the pick-up head is changed from low to high, the optical disc drive continuously determines that the track-cross direction of the pick-up head remains unchanged instead of using the phase difference to determine the track-cross direction of the pick-up head, so as to prevent the error. When the track-cross velocity of the pick-up head changes from high to low, the optical disc drive uses the phase difference method to determine the track-cross direction again.

Therefore, the determination of the track-cross velocity of the pick-up head is very important in track-cross control. If the determination result of the track-cross velocity is wrong, the optical disc drive is unable to use the correct method to determine the track-cross direction. Once the determination result of the track-cross direction is wrong, the whole track-cross operation fails and the optical disc drive is unable to execute certain operations.

The prior optical disc drive uses single means to determine the track-cross velocity of the pick-up head (such as a RFZC signal). The single means easily generates an error due to glitch or defect (such as scratch). This error causes the wrong determination of the track-cross velocity.

SUMMARY OF INVENTION

It is therefore a primary objective of the claimed invention to provide a method that uses two different techniques to determine the track-cross direction of the pick-up head, so as to solve the problem of the prior art.

The claimed invention, briefly summarized, discloses a method for determining a track-cross direction of a pick-up head of an optical disk drive. The method comprises the following steps. (1) When a track-cross velocity of the pick-up head was determined to be greater than a predetermined velocity, the track-cross velocity of the pick-up head is determined to be changed less than the predetermined velocity. If not, the track-cross direction remains unchanged. (2) When the track-cross velocity of the pick-up head was determined to be less than the predetermined velocity, it is further determined whether the track-cross velocity of the pick-up head is changed to be greater than the predetermined velocity. If not, the track-cross direction is determined according to a phase difference between a first track-cross signal and a second track-cross signal.

It is an advantage of the claimed invention that the claimed invention uses two different techniques to confirm the track-cross velocity of the pick-up head. Therefore, the claimed invention can prevent a wrong determination generated by a glitch and missed signals. The optical disc drive applying the present invention can therefore control the track-cross operation of the pick-up head correctly.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
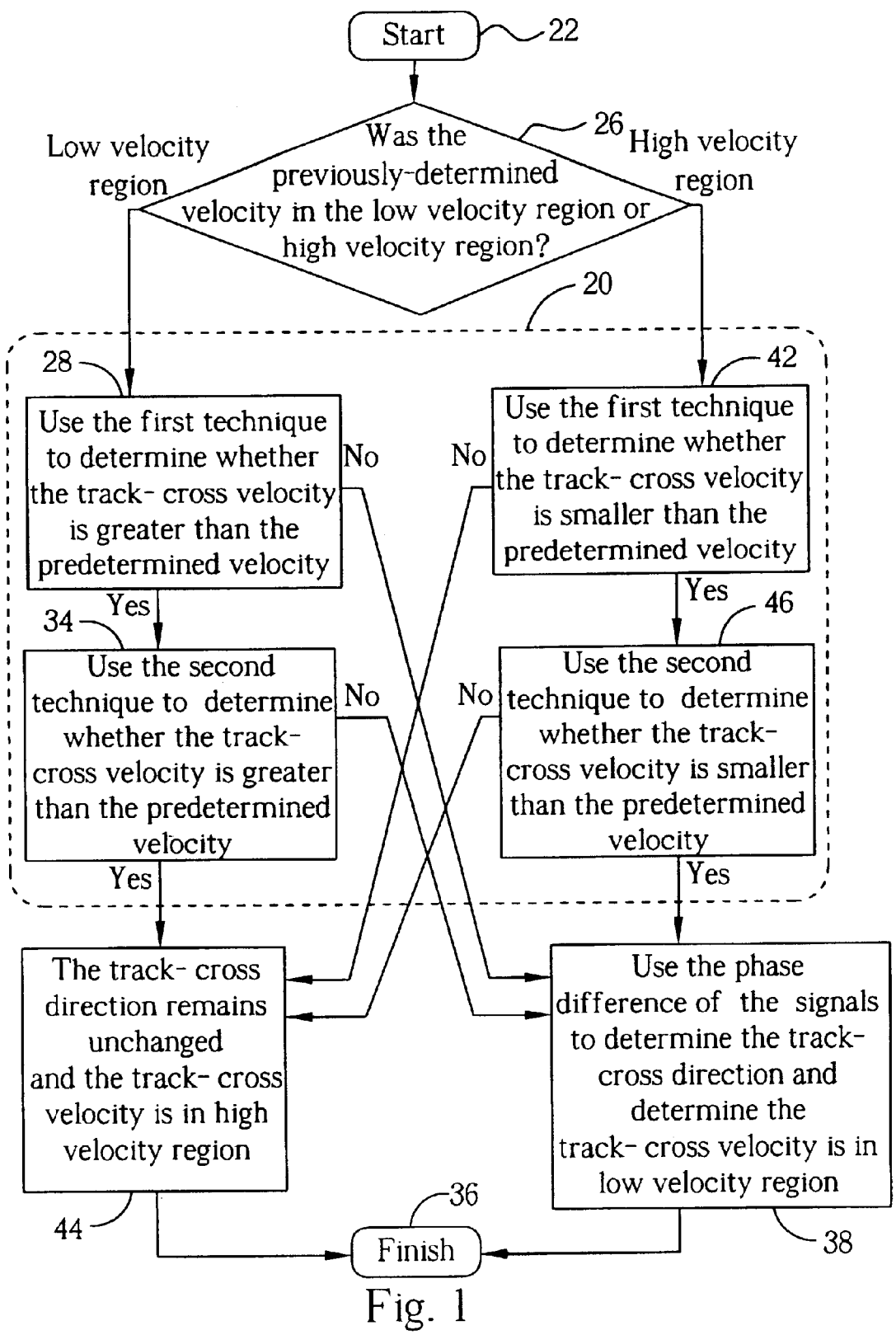
FIG. 1 is a flow chart for determining a track-cross velocity of a pick-up head according to the present invention.

Please refer to FIG. 1. FIG. 1 is a flow chart for determining a track-cross velocity of a pick-up head in an optical storage device according to the present invention. As mentioned above, before determination of the track-cross direction of the pick-up head, an optical disc drive must first determine a track-cross velocity of the pick-up head. How to determine the track-cross direction of the pick-up head is stated in an embodiment of the present invention. After the start step 22, the determination step 26 is executed so as to determine whether the previous-determined track-cross velocity of the pick-up head was in a high velocity region or in a low velocity region. Then, two different techniques (hereinafter called a first technique and a second technique) of the present invention method are used to determine the track-cross velocity of the pick-up head. At last, the determination result of the track-cross velocity is used to further determine the track-cross direction of the pick-up head. Details of the first technique and the second technique are illustrated as follows.

If the previous-determined track-cross velocity of the pick-up head was in the low velocity region, then the step 28 is executed. In the step 28, the first technique is used to determine whether the track-cross velocity is greater a predetermined velocity. If not (or said the first technique determines that the track-cross velocity is smaller than the predetermined velocity), since the previous-determined track-cross velocity was also in the low velocity region, the track-cross velocity of the pick-up head is confirmed to be a low velocity. Therefore, the step 38 is executed. In the step 38, the phase difference between the RFRP signal and the TE signal is used to determine the track-cross direction of the pick-up head. If the first technique determines that the track-cross velocity is greater than the predetermined velocity, the step 34 is executed. In the step 34, the second technique is used to determine whether the track-cross velocity is greater than the predetermined velocity. If the second technique determines that the track-cross velocity is greater than the predetermined velocity, it means that the track-cross velocity is confirmed to be greater than the predetermined velocity by both the first and the second technique. Therefore, the track-cross velocity of the pick-up head is really in the high velocity region. In this situation, the track-cross direction of the pick-up head remains unchanged (as shown in step 44). As mentioned before, if the track-cross velocity is in the high velocity region, the optical disc drive does not need to determine the track-cross direction based on the phase difference, but determines that the track-cross direction remains unchanged. If the second technique determines that the track-cross velocity is smaller than the predetermined velocity in the step 34, since the track-cross velocity of the pick up head is determined to be in the low velocity region in the step 26, the track-cross velocity is still determined to be in the low velocity region. Then, the step 38 is executed. In the step 38, the phase difference between the RFRP and the TE signals is used to determine the track-cross direction of the pick-up head.

Similarly, in the step 26, if the previous-determined track-cross velocity of the pick-up head was in the high velocity region, then the step 42 is executed. In the step 42, the first technique is used to determine whether the track-cross velocity is smaller than the predetermined velocity. If the track-cross velocity is confirmed as larger than the predetermined velocity both in the step 26 and 42, the track-cross velocity of the pick-up head is determined to be in the high velocity region, and then the step 44 is executed. In the step 44, the track-cross direction remains unchanged. In the step 42, if the track-cross velocity is smaller than the predetermined velocity, then the step 46 is executed. In the step 46, the second technique is used to determine whether the track-cross velocity is smaller than the predetermined velocity. In the step 46, if the track-cross velocity is determined to be not smaller than the predetermined velocity, then the step 44 is executed. In the step 46, if the track-cross velocity is confirmed to be smaller than the predetermined velocity, it is known that the track-cross velocity is confirmed in the low velocity region in both the step 42 and step 46 and then the step 38 is executed. In the step 38, it is determined that the track-cross velocity is in the low velocity region, and the phase difference between the RFRP signal and the TE signal is used to determine the track-cross direction of the pick-up head. The flow chart is terminated at the step 36. The procedure shown in FIG. 1 is triggered by a pulse, which is continuously asserted in the whole track-cross process (from step 22 to step 36) so as to update the information of track-cross direction frequently. In conclusion, the present invention can correctly determine the track-cross velocity of the pick-up head through double confirmation by the first technique and the second technique. Therefore, the optical disc drive can use the correct manner to determine the track-cross direction so as to control the operation of the pick-up head.

Figure 2:
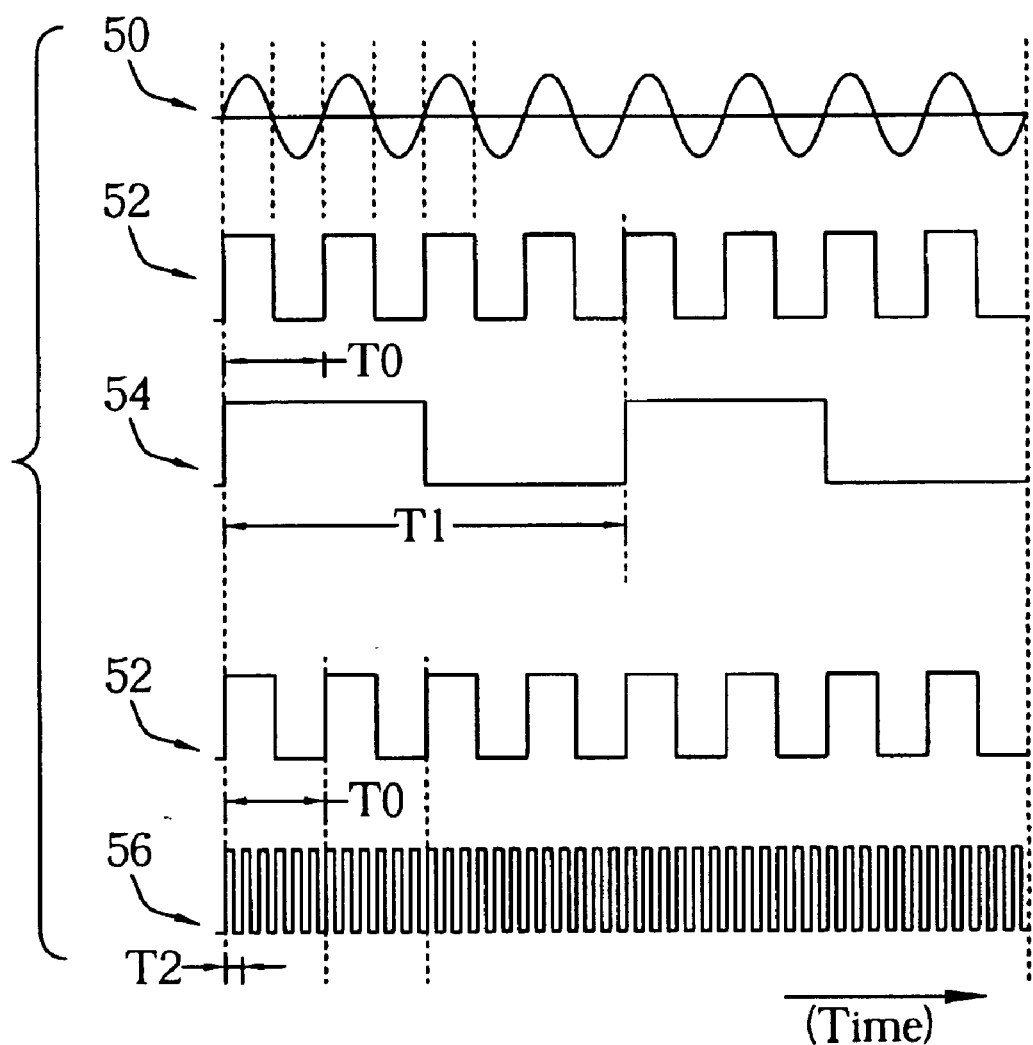
FIG. 2 is a timing diagram of related signals in the invention.

The method for determining the track-cross direction includes the first technique and the second technique. The first technique and the second technique are used to determine the track-cross velocity of the pick-up head. Please refer to FIG. 2. FIG. 2 is a timing diagram of related signals of the first technique and the second technique. The horizontal axis of FIG. 2 represents time. The signal sequence from top to bottom are the original track-cross signal 50, the zero-crossing signal 52 of the original track-cross signal 50, a first clock 54, the zero-crossing signal 52 of original track-cross signal (repeated for convenient illustration), and a second clock 56 respectively. The original track-cross signal 50 can be the RFRP signal or the tracking error (TE) signal. For convenient illustration, in the following statement, the zero-crossing signal of the RFRP signal (or said RFZC) is named as a first track-cross signal, and the zero-crossing signal of the tracking error signal (or named TEZC) is named as a second track-cross signal. The cycle of the RFRP signal and the tracking error signal are changed with the change of the track-cross velocity of the pick-up head. When the velocity of the pick-up head becomes higher, the cycles of the above signals will become shorter (or and the frequency will become higher). Therefore, the cycles of the first track-cross signal or the second track-cross signal are related to the track-cross velocity of the pick-up head.

The cycle of the first clock 54 is defined as T1. The first technique of the present invention is to use the first clock 54 to count how many cycles T0 of the zero-crossing signal 52 of the first or second track-cross signal are included inside each cycle T1. T0 may be changed due to the change of the track-cross velocity. The first reference cycle T1 is longer than T0. The track-cross velocity of the pick-up head can be calculated based on counting that how many cycles T0 are included inside the first reference cycle T1 (as shown in FIG. 2, each first reference cycle T1 includes four T0 of the zero-crossing signal 52). If the track-cross velocity becomes faster, the cycle T0 of the zero-crossing signal 52 of the first track-cross signal or the second track-cross signal will become shorter. The number of the cycles T0 of the zero-crossing signal 52 in each reference cycle T1 will become greater. The optical disc drive can calculate whether the number of T0 in each first reference cycle T1 is greater than a first predetermined number, so as to determine whether the track-cross velocity is greater than the predetermined velocity. The first predetermined number is determined based on the relationship between the first reference cycle T1 and the predetermined velocity. The first technique of the present invention can also calculate how many cycles T0 are included inside several reference cycles T1. Then an average is calculated so as to obtain the average number of the cycles T0 inside one first reference cycle T1, thereby decreasing the influence of the noise signal.

The cycle of the second clock 56 is named as T2. The second technique of the present invention is to use the second clock 56 to calculate how many cycles T2 are inside one cycle T0 of the zero-crossing signal 52. The frequency of the zero-crossing signals 52 is proportionally increased according to the track-cross velocity. The number of the second reference cycles T2 included inside the cycle T0 is used to determine the track-cross velocity. As shown in FIG. 2, the cycle T0 include six second reference periods T2. If the track-cross velocity becomes faster, the cycle T0 of the zero-crossing signal 52 will become shorter and fewer cycles T2 are included inside one cycle T0. The optical disc drive can calculate whether the number of the second reference cycles T2 included inside a cycle T0 is smaller than a second predetermined number, so as to determine whether the track-cross velocity is greater than the predetermined velocity. The second predetermined number is determined by the relationship between the second reference cycle and the predetermined velocity. The second technique of the present invention can also calculate how many second reference cycles T2 are included inside several cycles T0. Then an average is calculated so as to obtain the average number of the second reference cycles T2 inside one cycle T0, thereby decreasing the influence of the defective signal.

Since the cycle of the zero-crossing signal 52 is related to the track-cross velocity, the first clock and the second clock with fixed cycle are used to count the cycle of the zero-crossing signal 52 so as to determine the track-cross velocity of the pick-up head. In actual practice, the first technique and the second technique can use the same zero-crossing signal 52, or use different zero-crossing signals. As mentioned before, the zero-crossing signal 52 can be the zero-crossing signal of the RFRP signal (or said RFZC) or the zero-crossing signal of the tracking error signal (or said TEZC). In executing the first technique and the second technique, the first technique can use the zero-crossing signal of the second track-cross signal as the zero-crossing signal 52, and the second technique can use the zero-crossing signal of the first track-cross signal as the zero-crossing signal 52. Of course, both the first technique and the second technique can also use the zero-crossing signal of the first track-cross signal as the zero-crossing signal to represent the track-cross velocity of the pick-up head.

Figure 3:
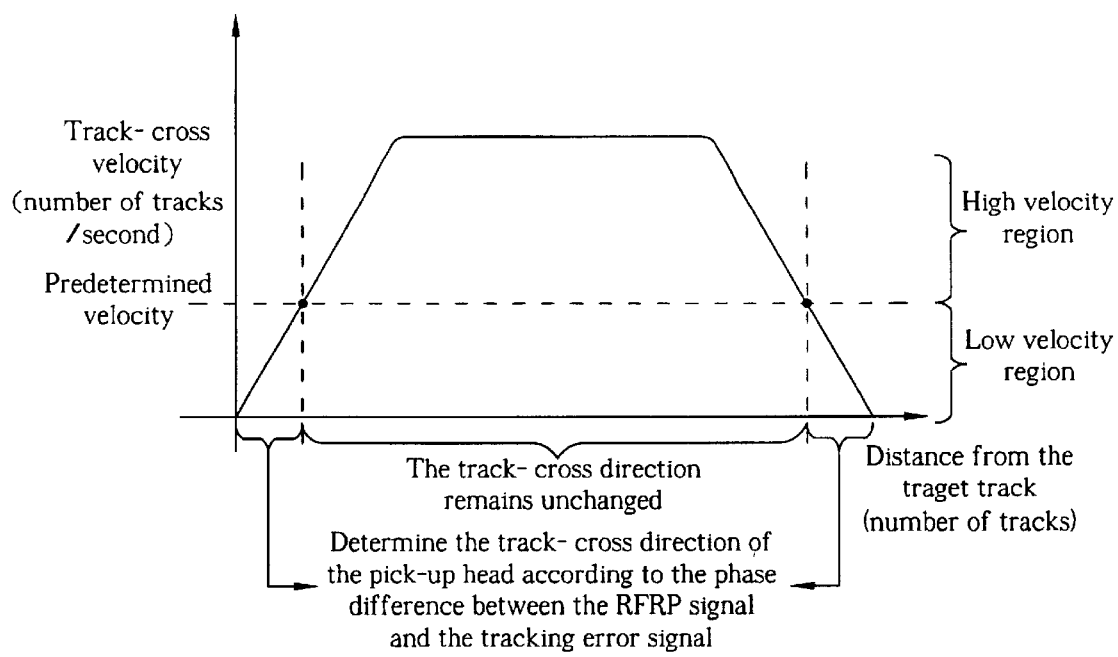
FIG. 3 is a track-cross velocity profile of the pick-up head in the long distance track-cross operation.

Please refer to FIG. 3. FIG. 3 is a chart of the track-cross velocity of the pick-up head in a long distance track-cross operation. The horizontal axis represents a distance between the present position of the pick-up head and the target track. The vertical axis represents the track-cross velocity of the pick-up head. FIG. 3 also shows a predetermined velocity. Only when the track-cross velocity of the pick-up head is smaller than the predetermined velocity (located inside the low velocity region), the optical disc drive use the phase difference between the RFRP signal and the tracking error signal to determine the track-cross direction of the pick-up head. When the track-cross velocity of the pick-up head is determined as greater than the predetermined velocity (located inside the high velocity region shown in FIG. 3), the track-cross direction of the pick-up head is determined to remain unchanged. As shown in FIG. 3, the track-cross velocity is not maintained at a fixed velocity. The track-cross velocity is adjusted based on the distance between the present position of the pick-up head and the target track. Although the initial track-cross velocity of the pick-up head is less than the predetermined velocity, the present invention still uses the two different techniques to continuously determine the track-cross velocity of the pick-up head. Similarly, when the track-cross velocity of the pick-up head is accelerated into the high velocity region, the present invention still needs to determine the change of the track-cross velocity of the pick-up head So that, when the track-cross velocity of the pick-up head is decelerated into the low velocity region, the optical disc drive can use the correct manner to determine the track-cross direction of the pick-up head.

The prior art only uses single technique to determine the track-cross velocity of the pick-up head and the determination is easily affected by glitches and scratches so that it maybe obtain a wrong determination. The wrong determination causes the optical disc drive to be unable to control the track-cross operation of the pick-up head correctly. In contrast to the prior art, the present invention uses two different techniques (the first technique and the second technique) to confirm the track-cross velocity of the pick-up head. Therefore, the present invention can prevent the wrong determination generated by glitches and mixed signals. The optical disc drive applying the present invention can control the track-cross operation of the pick-up head correctly. The invention is suitable for any optical storage device, such as a CD-ROM drive, a CD-R/RW drive, a DVD-ROM drive and the like.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for determining a track-cross direction of a pick-up head of an optical disk drive, the method comprising:

when a track-cross velocity of the pick-up head was determined to be greater than a predetermined velocity, determining whether the track-cross velocity of the pick-up head is changed to be less than the predetermined velocity; if not, keeping the cross-track direction unchanged; and when the track-cross velocity of the pick-up head was determined to be less than the predetermined velocity, determining whether the track-cross velocity of the pick-up head is changed to be greater than the predetermined velocity; if not, determining the track-cross direction according to a phase difference between a first track-cross signal and a second track-cross signal.

2. The method of claim 1, wherein the first track-cross signal is a radio frequency ripple (RFRP) signal, and the second track-cross signal is a tracking error (TE) signal.

3. The method of claim 1 further comprising: determining the track-cross velocity based on the number of cycles of the first or the second cross-track signal within a first reference cycle.

4. The method of claim 1 further comprising: determining the track-cross velocity based on the number of a second reference cycles within the cycle of the first and the second track-cross signals.

5. A method for determining a cross-track direction of a pick-up head of an optical disk drive, the method comprising:

when a track-cross velocity of the pick-up head was determined to be greater than a predetermined velocity, determining whether the track-cross velocity of the pick-up head is changed to be less than the predetermined velocity; if not, keeping the track-cross direction unchanged; otherwise, determining the track-cross velocity according to a phase difference between a first track-cross signal and a second track-cross velocity; and when the track-cross velocity of the pick-up head was determined to be less than the predetermined velocity, further determining whether the track-cross velocity of the pick-up head is changed to be greater than the predetermined velocity; if not, determining the track-cross direction according to the phase difference between the first track-cross signal and the second track-cross signal; otherwise, keeping the track-cross direction unchanged.

6. The method of claim 5, wherein the first track-cross signal is a radio frequency ripple (RFRP) signal, and the second track-cross signal is a tracking error (TE) signal.

7. The method of claim 5 further comprising: determining the track-cross velocity based on the number of cycles of the first or the second cross-track signal within a first reference cycle.

8. The method of claim 5 further comprising: determining the track-cross velocity based on the number of a second reference cycles within the cycle of the first and the second track-cross signals.

* * * * *